(12) United States Patent
Rivet et al.

(10) Patent No.: US 6,573,674 B1
(45) Date of Patent: Jun. 3, 2003

(54) CIRCUIT FOR CONTROLLING A LOAD TO BE SUPPLIED BY AN ALTERNATING CURRENT VOLTAGE

(75) Inventors: Bertrand Rivet, Saint Cyr sur Loire (FR); Robert Pezzani, Vouvray (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 09/787,785
(22) PCT Filed: Sep. 29, 1999
(86) PCT No.: PCT/FR99/02317
§ 371 (c)(1),
(2), (4) Date: May 16, 2001
(87) PCT Pub. No.: WO00/19778
PCT Pub. Date: Apr. 6, 2000

(30) Foreign Application Priority Data

Sep. 29, 1998 (FR) .............................................. 98 12395

(51) Int. Cl.[7] .......................... H02M 5/257; H02M 9/00
(52) U.S. Cl. ........................................ 318/431; 318/430
(58) Field of Search ................................ 318/244, 245, 318/430, 431; 388/803, 805, 809, 813, 816, 820, 828, 830

(56) References Cited

U.S. PATENT DOCUMENTS

| 3,742,337 A | * | 6/1973 | Digneffe |
| 3,761,789 A | * | 9/1973 | Krafft et al. |
| 4,107,584 A |   | 8/1978 | Roger |
| 4,110,671 A | * | 8/1978 | Roger |
| 4,350,944 A | * | 9/1982 | Strauch, Jr. .................. 318/779 |
| 4,422,030 A | * | 12/1983 | McAllise ..................... 318/779 |
| 4,680,536 A |   | 7/1987 | Roszel et al. |

FOREIGN PATENT DOCUMENTS

FR    2 249 477 A    5/1975

\* cited by examiner

Primary Examiner—Bentsu Ro
(74) Attorney, Agent, or Firm—Wolf, Greenfield & Sacks P.C.; James H. Morris

(57) ABSTRACT

The invention concerns a control circuit for controlling a load to be supplied in alternating current voltage, comprising a two-way switch capable of being controlled by phase angle, in series with the load between two terminals applying the alternating current supply, and comprising, in parallel with the switch, a first resistive element, a first capacitor and an element, in series with the first resistive element and the first capacitor, and operating, in steady state conditions, as a constant current source, the midpoint of the association in series connection of the first resistive element and the first capacitor being connected, via an element with two-way conduction automatically triggered when the voltage at its terminals exceeds a predetermined threshold, to a terminal controlling the switch.

28 Claims, 3 Drawing Sheets

CIRCUIT FOR CONTROLLING A LOAD TO BE SUPPLIED BY AN ALTERNATING CURRENT VOLTAGE

FIELD OF THE INVENTION

The present invention relates to a control circuit of a load supplied by an A.C. voltage. The present invention more specifically applies to a load directly connected to a network supplying a high A.C. voltage, for example the mains (for example, 220 or 110 volts).

BACKGROUND OF THE INVENTION

When a load is to be supplied by the A.C. electric network, there often is a problem of overcurrent upon power-on. The problem is particularly present in the case of a load having, upon power-on, a low impedance as compared to its steady-state impedance. This is the case, for example, for a filament-type lamp, where the filament is cold upon power-on, or for a motor which has no emf as it starts.

A first disadvantage of a so-called "cold" start on a load having a low impedance as compared to its nominal impedance is that it reduces the load lifetime. For a lamp, this creates a thermal shock onto the filament, which limits the lifetime thereof. It can indeed be noted that a light bulb most often breaks down at the lighting. For a motor, the overcurrent at the starting with respect to the nominal current adversely affects the lifetime of the brushes.

Another disadvantage of an unprotected cold start for this type of loads is that it often causes a flicker phenomenon on the other loads which may be connected to the same electric line. This phenomenon is due to the current surge peaks, repeated at each halfwave of the A.C. voltage (frequency of 50 or 60 Hz) as long as the load impedance has not reached a sufficient value. Such a parasitic phenomenon appears, in particular, on already lighted lamps, at the starting of a motor of a domestic appliance connected on the same electric network.

Most often, in applications where such low power-on impedance loads are used, the first reason for which the load is desired to be associated with a control circuit is a need for adjusting the load power. For example, it can be a light intensity adjustment for an incandescent lamp or an adjustment of the rotation speed of a motor.

FIG. 1 shows a first conventional example of a power variator of a load 1 to be supplied in A.C. mode. The circuit of FIG. 1 presently is, for a power variation control, one of the best performance/cost compromises.

Load 1 is connected, in series with a bidirectional switch, most often a triac 2, between two terminals E1, E2, that receive an A.C. supply voltage Vac. Triac 2 generally is controlled in phase angle by means of a circuit 3 connected in parallel on triac 2, that is, between terminal E1 and midpoint B of the series connection of the triac with the load.

Circuit 3 is formed of a diac 4, connected between the gate of triac 2 and the midpoint A of a series connection of a variable resistive element 5 with a capacitor C. The series connection of element 5 with capacitor C is connected in parallel with triac 2. Variable resistive element 5 is, for example, formed of a resistor R connected in series with a potentiometer P.

The operation of a control circuit illustrated by FIG. 1 is well known. This operation is briefly recalled hereafter in relation with FIG. 2, which shows an example of timing diagram of voltage $V_L$ across load 1 in steady state. It should be noted that, if load 1 is purely resistive, the shape of voltage $V_L$ also corresponds, in steady state, to the shape of current $I_L$ through the load.

At the beginning of each halfwave of supply voltage Vac, triac 2 is blocked and voltage $V_L$ across load 1 is zero. It is assumed that resistor R has a very high value so that the impedance of load 1 is negligible with respect to this value. As the amplitude of the A.C. voltage increases, capacitor C charges through resistor R and potentiometer P. When voltage $V_{AB}$ across capacitor C reaches the threshold voltage of diac 4, said diac turns on and a current then flows through the gate of triac 2. At this time (t0, FIG. 2), the triac triggers and the voltage across load 1 becomes voltage Vac, neglecting the voltage drop in triac 2. At the end of each halfwave, triac 2 blocks by the disappearing of the current flowing therethrough, and the above-described operation repeats at the following halfwaves.

The phase angle power variation is obtained by having the value of the resistor of element 5 vary by a variation of potentiometer P. Indeed, the greater the value of potentiometer P, the longer capacitor C will take to have across its terminals a sufficient voltage to trigger diac 4, and the later time to will come with resect to the beginning of the halfwave.

In steady state, that is, once load 1 has reached its nominal impedance, the circuit such as shown in FIG. 1 operates properly in power variation.

However, in transient state, that is, either at the powering-on or in case of an increase of the power of the load by decrease of the resistance of potentiometer P, such a circuit has the disadvantage of creating strong current peaks in the load. Indeed, when triac 2 turns on, the load then sees the mains voltage and, what is more, under a high amplitude due to the phase angle modulation performed for the steady state power variation. If the load has a very small impedance, this then almost create a short-circuit on the mains.

U.S. Pat. No. 4,680,536 discloses a control circuit of the same type as the invention and based on the diagram of FIG. 1. With respect to the diagram of FIG. 1, the circuit of this document comprises a rectifying bridge, the input terminals of which are connected between the common terminal of the resistor and the potentiometer and the common terminal of the triac and the load. The bridge comprises, in a diagonal, a second resistor, a second capacitor and a Zener diode. Such a circuit has for object to limit the current peaks in the load at the lighting.

A drawback of such a circuit is that it necessitates a voltage limiting component (Zener diode) for limiting the voltage in the bridge diagonal (at the terminals of the second capacitor); in the absence of such a limitor, the voltage in diagonal could reach the peak value of the A.C. voltage. Another drawback is that the second capacitor is however submitted to a relatively high voltage (higher than the breakover voltage of the diac, so that the circuit necessitates two capacitors that must support a voltage higher than the breakover voltage of the diac.

Another disadvantage of the circuit of FIG. 1 and of the circuit of U.S. Pat. No. 4,680,536 is that potentiometer P has to be a high voltage potentiometer, which is relatively expensive.

FIG. 3 shows a second conventional embodiment of a control circuit of a triac 2, series-connected with a load 1 to be supplied by means of an A.C. voltage Vac. The circuit of FIG. 3 aims not only at enabling a power variation of load 1 in steady state but also at limiting the surge current upon power-on, that is, as long as the load impedance is small as compared to its steady state impedance. Such a circuit requires a control block 6 of the actual traic and a supply block 7. Indeed, block 6 is generally made in the from of an integrated circuit and thus needs to be supplied by a regulated voltage provided by block 7. Block 6 is connected in parallel with triac 2, and thus is connected between terminals E1 and B of the assembly. Block 7 is connected to supply terminals E1 and E2 and must include a reference connection to node B. An output of block 6 is connected to the gate of triac 2 to ensure its control while an output of block 7 provides a D.C. regulated voltage to block 6.

An assembly such as illustrated in FIG. 3 enables obtaining satisfactory results, both for the power variation and for the transient state current surge limitation However, it has the disadvantage of having a particularly complex structure and a high cost

SUMMARY OF THE INVENTION

The present invention aims at providing a novel solution to solve the surge current problem at the starting of loads supplied by an A.C. voltage, this solution palliating at least one of the drawbacks of the known solutions.

The present invention aims, in particular, at providing a solution which enables not only a variation of the load power in steady state, but also a limitation of the surge current when the load has a small impedance during in a transient state.

The present invention also aims at providing a solution which is of particularly simple implementation and which has a low cost with respect to conventional integrated circuit solutions.

The invention also aims at reducing the number of components necessary for making the circuit and in particular to avoid the use of voltage limiting components as in U.S. Pat. No. 4,680,536.

The invention also aims at avoiding the use of two capacitors that must support a voltage higher than the breakover voltage of a bidirectional conduction element (diac) used for controlling a bidirectional switch (triac) controlled by its phase angle.

To achieve these objects, the present invention provides a control circuit of an A.C. load, of the type including a bidirectional switch controllable by phase angle, in series with the load between two terminals of application of the A.C. supply, and including, in parallel with the switch, a first resistive element, a first capacitor and an element, in series with said first resistive element and said first capacitor, and operating, in steady state, like a constant current source, the midpoint of the series connection of the first resistive element and of the first capacitor being connected, via a bidirectional conduction element automatically turned on when the voltage thereacross exceeds a predetermined threshold, to a control terminal of the switch.

According to an embodiment of the present invention, the element in series with the first resistive element and the first capacitor is formed of a rectifying bridge in the diagonal of which are associated, in parallel, a second capacitor and a second resistive element.

According to an embodiment of the present invention, the value of the second capacitor is large with respect to the value of the second capacitor.

According to an embodiment of the present invention, the first resistive element is a fixed resistor, the second resistive element being a variable resistor.

According to an embodiment of the present invention, the first resistive element is a variable resistor, the second resistive element being a fixed resistor.

According to an embodiment of the present invention, the bidirectional switch is a triac.

According to an embodiment of the present invention, the automatically triggered bidirectional conduction element is a diac.

The foregoing objects, features and advantages of the present invention, will be discussed in detail in the following non-limiting description of specific embodiments in connection with the accompanying drawings, wherein:

DETAILED DESCRIPTION

Figure 1:
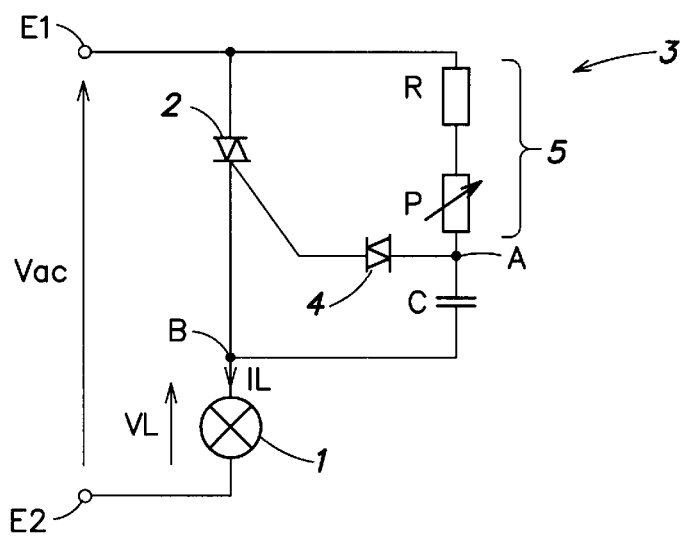
FIGS. 1 to 3, previously described, are meant to show the state of the art and the problem to solve.
Figure 2:
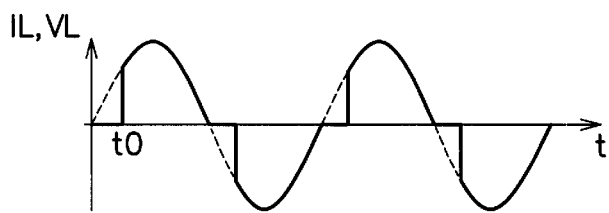

The same elements have been designated by the same references in the different drawings. For clarity, only those elements which are necessary to the understanding of the present invention have been shown in the drawings and will be described hereafter. In particular, the load to be controlled by the circuit of the present invention has been shown generically and will not be detailed according to whether it is a lamp, a motor, or others.

Figure 4:
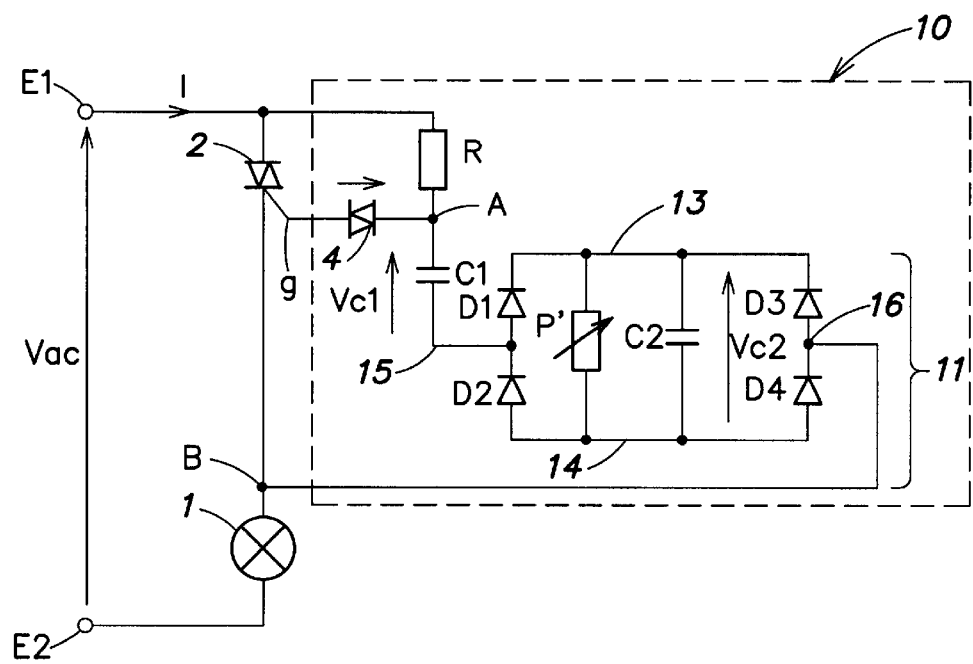
FIG. 4 shows a preferred embodiment of a control circuit of a load to be supplied by an A.C. voltage according to the present invention.

FIG. 4 shows an embodiment of a control circuit of a load 1 supplied by an A.C. voltage Vac according to the present invention.

As previously, load 1 is series-connected with a triac 2, or any analogous bidirectional switch, between two terminals E1, E2 that receive voltage Vac.

Triac 2 is controlled by a circuit 10 according to the present invention which, as previously, is connected in parallel with triac 2, that is, between terminal E1 and node B forming the midpoint of the series connection of load 1 with triac 2. Circuit 10 includes an output connected to the gate g of triac 2.

Circuit 10 of the present invention is adapted to controlling triac 2 by phase angle like a conventional circuit such as shown in FIG. 1. Thus, according to a preferred embodiment of the present invention, gate g of triac 2 (or the control terminal of a similar component) is connected to a first terminal of a diac 4 (or any other bidirectional conduction component automatically turned on when the voltage thereacross exceeds a predetermined threshold), a second terminal A of which is connected to the midpoint of a series connection of a resistive element R with a capacitive element 11.

A feature of the embodiment of FIG. 4 is that the resistive element R is formed of a fixed resistor of high value.

Another feature of this embodiment is that the capacitive element 11, connected between nodes A and B, is made variable. Thus, functionally, it is provided to vary, no longer the resistance as in a conventional circuit such as shown in FIG. 1, but the capacitive element, to adjust the load supply power in steady state.

A first advantage of the present invention should already be noted, which is that the only high voltage capacitive or resistive component of the circuit now is the resistive element connecting terminals E1 and A. In the embodiment of FIG. 4, the invention already provides an improvement with respect to the conventional circuit of FIG. 1, even for a steady state operation, which is to avoid using a high voltage potentiometer (P, FIG. 1).

A first solution to make a variable capacitive element would be to use a variable capacitor. However, such a component is particularly expensive, especially since it has to be bidirectional. Further, the use of a mere variable capacitor would not enable solving another aim of the present invention, which is to limit the surge current in transient circuit power-on states.

Figure 5:
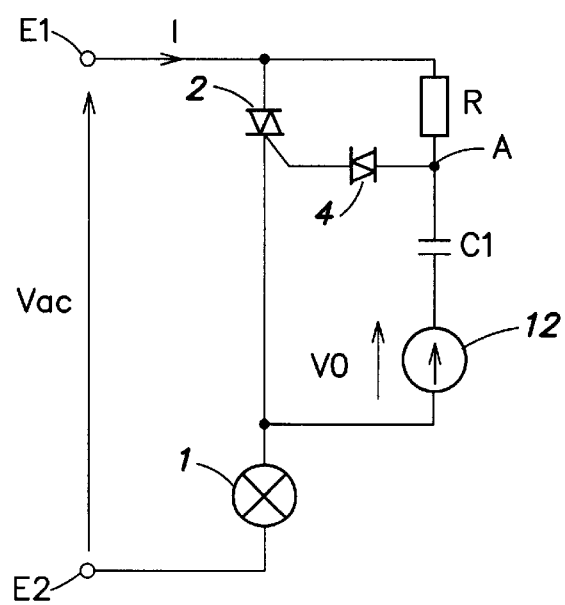
FIG. 5 is a simplified equivalent diagram of the circuit of FIG. 4 in steady state.

A feature of the present invention is to provide, in parallel on diac 4 or the like, a capacitor C1 in series with a circuit functionally forming a variable "voltage source" taking a fixed value in steady state. This feature of the present invention is illustrated by FIG. 5 which shows the equivalent diagram of a control circuit according to the present invention in steady state. The representation of FIG. 5 is simplified and approximate in that source 12, determining a voltage V0 depending on the power desired for the load, is bidirectional.

This "voltage source" is, according to the present invention, made by means of a capacitor C2 (FIG. 4) preferentially assembled in parallel with a potentiometer P' between two rectified output terminals 13, 14 of a diode bridge D1, D2, D3, D4, series-connected with capacitor C1 (that is, both A.C. input terminals 15, 16 of which are connected between capacitor C1 and node B).

According to the present invention, capacitor C2 is of high value as compared to capacitor C1 for, in steady state, maintaining a substantially constant voltage, at least over the duration of a halfwave. Thus, capacitor C2 applies an offset voltage V0 to capacitor C1 which is approximately constant over the duration of a halfwave of the A.C. supply. The function of diodes D1, D2, D3, D4 is to make the operation bidirectional. The function of potentiometer P', in this embodiment, is to modify the value of the offset voltage.

The use of capacitor C2 enables making this offset voltage progressive, as will be seen hereafter, during load supply power variations.

Figure 6:
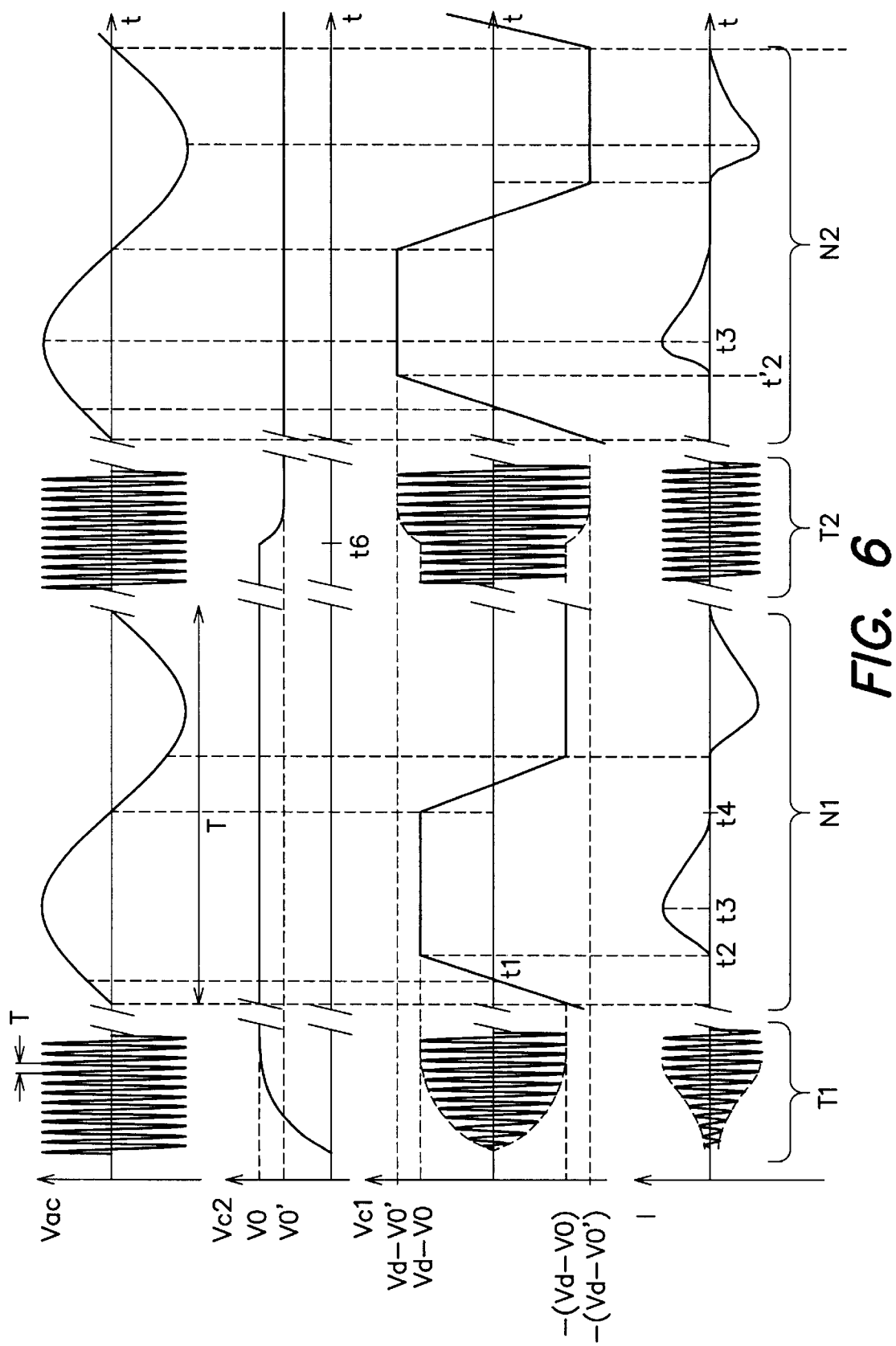
FIG. 6 illustrates, in the form of timing diagrams, the shape of different voltages and currents characteristic of the circuit of the present invention.

The operation of the circuit according to the present invention will be described hereafter in relation with FIG. 6 which illustrates, in the form of timing diagrams, an example of shapes of voltages Vac, $V_{C1}$ and $V_{C2}$ across capacitors C1 and C2, and of current I sampled from the A.C. supply. The timing diagrams of FIG. 6 show four successive operating phases. A first phase T1 corresponds to a load starting or power-on phase. A second phase N1 corresponds to a first steady state phase for a first load operating power. A third phase T2 corresponds to a transient phase of load state change, that is, of modification of the load supply power by modifying the turn-on phase angle of triac 2. A fourth phase N2 corresponds to a second example of steady state established after the power change of the preceding phase. It should be noted that, in the timing diagrams of FIG. 6, the time scale is different in the different phases. The reference corresponds to A.C. supply voltage Vac which has a fixed period T.

At the starting (phase T1), voltage $V_{C2}$ being initially zero, the time required to charge capacitor C1 to value Vd–$V_{C2}$, where Vd represents the threshold voltage of diac 4, is long. According to the values of resistor R, of potentiometer P', and of capacitors C1 and C2, it is possible that during the first mains halfwaves, capacitor C1 does not have the time to reach the threshold required for the triggering of diac 4, and thus of triac 2. Capacitor C2 then progressively charges, which results in progressively deceasing the time required for capacitor C1 to reach threshold voltage Vd–$V_{C2}$. Thus, during starting phase T1, voltage $V_{C2}$ progressively increases to reach value V0 chosen for the steady state. Conversely, the phase angle progressively decreases to reach the phase angle chosen for the steady state. Since the phase angle is very large at the beginning, there is no current peak upon power-on, even though the load impedance is low.

Current I progressively increases over several halfwaves, to reach the nominal current. For example, for a lamp, this progressive increase enables progressively heating the filament.

In steady state of capacitor C2 (phase N1 or N2), that is, when voltage $V_{C2}$ has become constant, the value (V0 or V0') of voltage $V_{C2}$ is set by the value of potentiometer P'.

When voltage Vac is sufficient for the bridge diodes to turn on according to the voltage stored by capacitor C2, capacitor C1 charges (time t1). When voltage $V_{C1}$ reaches, in absolute value, the threshold voltage Vd of diac 4 minus voltage V0 or V0' precharged in capacitor C2, triac 2 turns on (time t2) and current I in load 1 (thus, sampled from the mains) increases until the top of the halfwave is reached (time t3). Current I decreases with the halfwave, to become zero at the zero crossing of the halfwave (time t4), when triac 2 blocks by the disappearing of the current flowing therethrough.

Capacitor C1 remains charged to value Vd–V0 or —(Vd–V0) until the next halfwave, and the same operation is repeated, capacitor C1 charging from value Vd–V0 to a value —(Vd–V0) or conversely.

It will be noted that, contrarily to the case of U.S. Pat. No. 4,680,536 wherein the capacitor of the bridge is precharged for charging the external capacitor (C, FIG. 1) at the breakover voltage of the diac, the invention provides a serial charging of the capacitor C1 and C2 (the capacitor C1 being charged through the capacitor C2) at the breakover voltage of the diac 4.

As illustrated in FIG. 6 between phases N1 and N2, a modification of value V0 or V0' results in a modification of the power in the load. In the example shown, it is assumed that value V0' is smaller in phase N2 than value V0 in phase N1. As a result, capacitor C1 is, at each halfwave, precharged to a value Vd–V0',—(Vd–V0') which, in absolute value, is greater in phase N2 than its precharge level in phase N1. Accordingly, capacitor C1 takes longer to reach the level required to breakover diac 4, and thus to turn on the triac (time t'2). This results in a shorter period t3–t'2 separating the top of the halfwave from the turning-on of the triac, and thus in a smaller provided power.

The adjusting of offset voltage $V_{C2}$ (V0 or V0'), and thus of the triggering angle, is made by potentiometer P'. When the value of the resistance of potentiometer P' decreases, the value of voltage $V_{C2}$ in steady state decreases.

In steady state, the relation between triggering angle d of triac 4 and the different parameters of the circuit can, as a first approximation, be expressed as:

$$\cos(d)=1-4\pi VdC1R/(4Rp'C1+T)VM,$$

where VM represents the peak voltage of A.C. supply Vac, and where Rp' represents the resistance of potentiometer P' (and of its possible heel resistance).

The above relation shows that the adjusting of the phase angle could also be performed by resistor R as in the conventional case of FIG. 1. Therefore, according to another embodiment of the invention, the resistive element connecting the terminals E1 and A is a potentiometer and a fixed resistor is substituted for the potentiometer P' (FIG. 4). The operation can be deduced from the one explained above. The potentiometer is then however a high voltage potentiometer while potentiometer P' of the preferred embodiment of FIG. 4 only sees a low voltage, for example, under 50 volts. Further, to vary the phase angle d by a factor 10, the value of resistance R should then be varied by a factor 10, which results in varying the starting time more than in the preferred embodiment of FIG. 4, that is, lengthening the duration of the phase T1 required to reach the steady state. This last point may however be preferred in some applications.

It should be noted that the value of capacitor C2 does not intervene in a first approximation, the latter essentially determining the duration of the transient phases.

The change of state (power) is illustrated by phase T2 in which it is assumed that at a time t6, the value of potentiometer P' is modified to result in a modification of the value charged in capacitor C2 from value V0 to a smaller value V0'. As for the starting (phase T1), capacitor C2 takes several halfwaves to reach this new value (V0'). As a result, this state change occurs without any current peak which would be prejudicial to the load lifetime.

An advantage of the present invention is that it combines a good limitation of the current surge at the starting or in a change of state while enabling a power variation of the load by means of a variation of a resistive element.

Limiting the successive current peaks in the transient state limits mains disturbances and suppresses flickering in the other possible loads.

Figure 3:
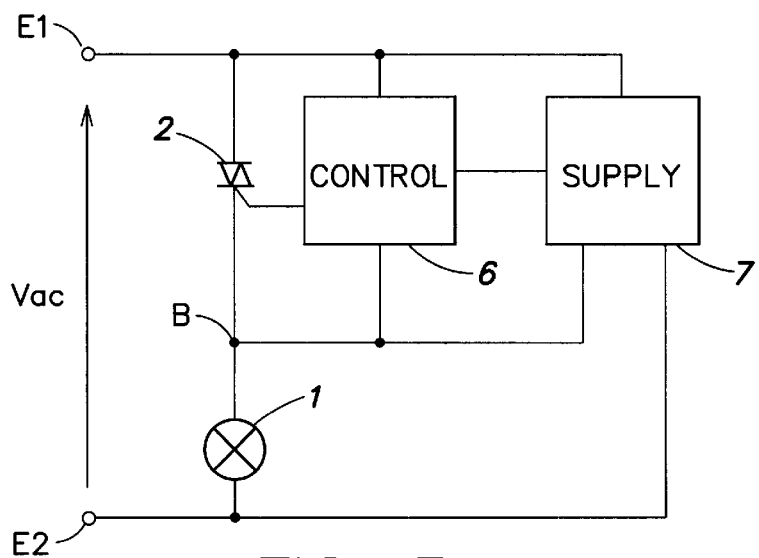

Another advantage of the present invention is that it requires no regulated low voltage power supply as in the conventional case of FIG. 3 to supply an integrated circuit.

Another advantage of the invention is that it reduces the number of used components. In particular, a voltage limiting element in the diagonal of the bridge is no longer useful, contrarily to the U.S. Pat. No. 4,680,536. This advantage results from the fact that, according to the invention, the element forming the voltage source is serially connected with the resistive element R and the capacitor C1 while, in the U.S. Patent, the bridge is in parallel with the capacitor (FIG. 1).

It should be noted that potentiometer P' (or the substituted fixed resistor) is also used to discharge capacitor C2 to enable a fast circuit reset upon power-off. This condition is necessary for capacitor C2 to be able to perform its damping function at the next tuning-on The values to be given to the different components of the present invention are determined according to the application, to the load characteristics, and to the desired operation.

It should be noted that a first time constant linked to the circuit starting is essentially determined by the respective values of resistor R and capacitor C2. This time constant has to be as constant as possible even if the phase angle, that is, voltage $V_{C2}$, is varied. Accordingly, it is desired to have it depend very little on the value of potentiometer P'. Preferably, a high resistance R will be chosen to limit circuit power dissipation. Indeed, resistor R sees the high mains voltage.

The first time constant is determined, according to the load, to avoid harmful overcurrents. In some applications, for example, lamp control, it will however be desired to make transient periods as little perceptible as possible for the user, and thus to have a rather small time constant A second time constant, essentially determined by the values of potentiometer P' and of capacitor C2, conditions the turn-off duration, that is, the circuit reset duration. Preferably, it is desired to make this time constant as small as possible, so that the circuit performs its function even in case of close successive startings.

It should be noted that capacitor C1 has to be bidirectional. However, a low voltage capacitor is enough. Preferably, a value under 10 $\mu$F will be chosen for reasons of cost and bulk. It should also be noted that capacitor C2, the value of which is greater (several hundreds of $\mu$F) may be a chemical (one-way) capacitor. Additionally, the voltage seen by the capacitors C1 and C2 is individually lower than the breakover voltage of the diac 4. It is the serial association C1+C2 that is, according to the invention, charged at the breakover voltage of the diac. Additionally, with the preferred values of capacitors C1 and C2, the peak voltage across capacitor C1 is higher than the voltage across capacitor C2 that can accordingly be a low voltage capacitor.

As a specific example of implementation, a circuit such as illustrated in FIG. 4 can be formed by using, for the different components, the following values:

R=15k$\Omega$;

C1=2 $\mu$F;

C2=300 $\mu$F; and

P'=25 k$\Omega$, variable, with a heel resistance of 820 $\Omega$.

With such components, for example with a motor of vacuum cleaner motor type and for a 220-volts/50-Hz mains power supply, a starting phase duration T1 on the order of 2 seconds, a correct behavior at the successive startings and stoppings, and a progressive power adjustment by varying phase angle d from 2 ms to 10 ms, are obtained.

Of course, the present invention is likely to have various alterations, modifications, and improvements which will readily occur to those skilled in the art. In particular, the sizing of the different components of the present invention is within the abilities of those skilled in the art provided that they respect the functional indications given hereabove.

What is claimed is:

1. A control circuit of an A.C. load, of the type including a bidirectional switch controllable by phase angle, in series with the load between two terminals of application of the A.C. supply, wherein it includes, in parallel with the switch, a first resistive element, a first capacitor and an element, in series with said first resistive element and said first capacitor, and operating, in steady state, like a constant current source, a midpoint of the series connection of the first resistive element and of the first capacitor being connected, via a bidirectional conduction element automatically turned on when the voltage thereacross exceeds a predetermined threshold, to a control terminal of the switch, wherein the element, in series with said first resistive element and the first capacitor comprises a rectifying bridge in a diagonal of which are associated, in parallel, a second capacitor and a second resistive element.

2. The control circuit of claim 1, wherein a value of the second capacitor is large with respect to a value of the first capacitor.

3. The control circuit of claim 1, wherein said first resistive element is a fixed resistor, the second resistive element being a variable resistor.

4. The control circuit of claim 1, wherein the first resistive element is a variable resistor, the second resistive element being a fixed resistor.

5. The control circuit of claim 1 wherein the bidirectional conduction element is a triac.

6. The control circuit of claim 1 wherein the bidirectional conduction element is a diac.

7. A method for providing power to a load during a plurality of alternating current cycles, comprising an act of:
   a) during a steady-state phase of the load, controlling a current provided to the load during each cycle of the plurality of alternating current cycles, at a particular phase angle after a zero-crossing of each cycle, such that the current is gradually varied to a peak magnitude during each cycle;
   wherein the current initially has a zero magnitude at the particular phase angle after the zero-crossing and wherein the act a) comprises an act of:
      controlling the current such that the current gradually varies from the zero magnitude to the peak magnitude during each cycle.

8. The method of claim 7, wherein the power is provided by an AC voltage supply, and wherein the act a) comprises:
   controlling the current provided to the load without using another voltage supply in addition to the AC voltage supply.

9. The method of claim 8, wherein the act a) comprises:
   controlling the current provided to the load without using a DC voltage supply in addition to the AC voltage supply.

10. A method for providing power to a load during a plurality of alternating current cycles, comprising an act of:
   a) during a steady-state phase of the load, controlling a current provided to the load during each cycle of the plurality of alternating current cycles, at a particular phase angle after a zero-crossing of each cycle, such that the current is gradually varied to a peak magnitude during each cycle;
   further comprising an act of:
      b) controlling the phase angle during a power-on phase of the load so as to gradually vary the peak magnitude of the current provided to the load during the power-on phase.

11. The method of claim 10, wherein the act b) comprises an act of:
   c) decreasing the phase angle during the power-on phase so as to gradually increase the peak magnitude.

12. The method of claim 11, wherein the load is coupled to a variable capacitive element, and wherein the act c) comprises:
   d) charging the variable capacitive element during the power-on phase so as to decrease the phase angle.

13. The method of claim 12, further comprising an act of:
   e) controlling the particular phase angle after the zero-crossing at which the act a) occurs.

14. The method of claim 13, wherein the load is connected in series with a resistive element and a variable capacitive element and the act e) comprises an act of:
   f) adjusting the variable capacitive element so as to control the particular phase angle.

15. The method of claim 14, wherein the act f) comprises an act of:
   performing the act f) while holding a value of the resistive element constant.

16. The method of claim 14, wherein the load, the resistive element and the variable capacitive element also are connected in series with at least one capacitor, wherein the variable capacitive element includes a variable voltage source, and wherein the act f) comprises an act of:
   g) varying the variable voltage source to provide a variable offset voltage to the at least one capacitor.

17. The method of claim 16, wherein the variable voltage source includes a diode bridge, at least one second capacitor connected between two rectified output terminals of the diode bridge, and at least one potentiometer connected in parallel with the at least one second capacitor, and wherein the act g) comprises an act of:
   h) varying the at least one potentiometer to modify the variable offset voltage.

18. An apparatus that provides power to a load during a plurality of alternating current cycles comprising:
   a controller that controls a current provided to the load during each cycle of the plurality of alternating current cycles, at a particular phase angle after a zero-crossing of each cycle, such that the current is gradually varied to a peak magnitude during each cycle;
   wherein the controller controls the current such that the current gradually varies from the zero magnitude to the peak magnitude during each cycle.

19. The apparatus of claim 18, wherein the power is provided by an AC voltage supply.

20. The apparatus of claim 19, wherein the controller does not require a DC voltage supply in addition to the AC voltage supply to control the current provided to the load.

21. The apparatus of claim 18, wherein the controller controls the particular phase angle.

22. The apparatus of claim 21, wherein the controller comprises:
   a resistive element; and
   a variable capacitive element connected in series with the resistive element,
   wherein the resistive element and the variable capacitive element are connected in series with the load, and wherein the controller adjusts the variable capacitive element to control the particular phase angle.

23. The apparatus of claim 22, wherein the resistive element is constant.

24. The apparatus of claim 22, wherein the variable capacitive element comprises a variable voltage source, and wherein the controller further comprises:
   at least one capacitor that receives a variable offset voltage from the variable voltage source.

25. The apparatus of claim 24, wherein the variable voltage source includes:
   a diode bridge;
   at least one second capacitor connected between two rectified output terminals of the diode bridge; and
   at least one potentiometer connected in parallel with the at least one second capacitor.

26. An apparatus that provides power to a load during a plurality of alternating current cycles comprising:
   a controller that controls a current provided to the load during each cycle of the plurality of alternating current cycles, at a particular phase angle after a zero-crossing of each cycle, such that the current is gradually varied to a peak magnitude during each cycle;
   wherein the controller further comprises a phase angle controller that controls the phase angle during a power-on phase of the load so as to gradually vary the peak magnitude of the current provided to the load during the power-on phase.

27. The apparatus of claim 26, wherein the phase angle controller decreases the phase angle during the power-on phase so as to gradually increase the peak magnitude.

28. The apparatus of claim 27, further comprising:
   a variable capacitive element, coupled to the load;
   wherein the phase angle controller charges the variable capacitive element during the power-on phase so as to decrease the phase angle.

* * * * *

UNITED STATES PATENT AND TRADEMARK OFFICE
CERTIFICATE OF CORRECTION

PATENT NO. : 6,573,674 B1
DATED : May 6, 2003
INVENTOR(S) : Peter Johnson

It is certified that error appears in the above-identified patent and that said Letters Patent is hereby corrected as shown below:

Column 2,
Line 23, should read -- time to will come with respect to the beginning of the --
Line 32, should read -- then almost creates a short-circuit on the mains. --

Column 3,
Lines 2 and 3, should read -- requires a control block 6 of the actual triac and a supply block 7. Indeed, block 6 is generally made in the form of an --

Column 6,
Line 3, should read -- charges, which results in progressively decreasing the time --

Column 7,
Line 9, should read -- Further, to vary the phase angle $\underline{d}$ by a factor 10, the value --
Line 49, should read -- function at the next turning-on. --

Signed and Sealed this

Fifteenth Day of July, 2003

JAMES E. ROGAN
*Director of the United States Patent and Trademark Office*